Oct. 28, 1958     B. L. ERTSGAARD ET AL     2,858,141
ADJUSTMENT BRACKET FOR LAWN MOWER HANDLES AND ROLLERS

Filed Sept. 13, 1954

INVENTORS
BYRON L. ERTSGAARD
VERNON J. WORREL
Williamson, Williamson
Schroeder + Adams
ATTORNEYS

United States Patent Office 2,858,141
Patented Oct. 28, 1958

2,858,141

ADJUSTMENT BRACKET FOR LAWN MOWER HANDLES AND ROLLERS

Byron L. Ertsgaard, Minneapolis, and Vernon J. Worrel, St. Paul, Minn., assignors to Toro Manufacturing Corporation, Minneapolis, Minn., a corporation of Minnesota Application September 13, 1954, Serial No. 455,578

5 Claims. (Cl. 280—47.37)

This invention relates to lawn mowers and the like, and more specifically relates to apparatus for adjustably fixing the position of the handle thereof relative to the frame.

When a lawn mower is used by persons of various sizes and is used on various types of terrain, it is desirable to be able to fix the handle thereof in various vertical positions. Although various types of apparatus have been devised in the past for holding the mower handle in a fixed position many of such types of apparatus have had serious disadvantages. One of the most important of these disadvantages is that many of such types of apparatus do not provide positive locking of the handle and will, when the mower goes over rough terrain, release the handle allowing it to either swing free in a vertical direction or to swing to another vertical position and be fixed therein. Another of the disadvantages is that many of such types of apparatus do not permit ready and easy adjustment of the vertical position of the handle.

With these foregoing statements in mind, it is to the substantial elimination of these and other disadvantages to which our invention is directed along with the inclusion therein of other novel and desirable features.

One of the objects of our invention is to provide new and improved apparatus of extremely simple and inexpensive construction and operation for adjustably fixing the vertical position of the vertical swingable handle of a lawn mower relative to the frame thereof.

Another object of our invention is to provide novel apparatus for readily and easily adjustably fixing a lawn mower handle in any of a wide range of vertical positions including a substantially upright position for storing the lawn mower.

Still another object of our invention is to provide a new bracket for adjustably fixing the vertical position of a lawn mower handle, which bracket is swingably carried by the frame of the mower and is adjustably and releasably connected to the mower handle and which bracket is constructed and shaped to materially restrict extension of the handle-connecting portion thereof in a direction rearwardly from the handle and to maintain the handle-connecting portion thereof in an out-of-the-way position at all times and in substantially all positions of the mower handle.

A further object of our invention is to provide a novel bracket for interconnecting the handle of a lawn mower and the frame thereof and for adjustably fixing the vertical position of the handle, which bracket is shaped and constructed to remain in an out-of-the-way position in substantially any position of the handle and which bracket is resiliently urged and maintained in handle-locking position to preclude the handle from being accidentally released and to maintain the bracket in the out-of-the-way position.

A still further object of our invention is to provide an improved interconnecting bracket or strap for readily and easily adjustably fixing the relative vertical position of any of the vertically swingable guide members of the lawn mower with respect to the frame thereof.

These and other objects and advantages of our invention will more fully appear from the following description made in connection with the accompanying drawings wherein like reference characters refer to the same parts throughout the several views and in which.

Figure 1:
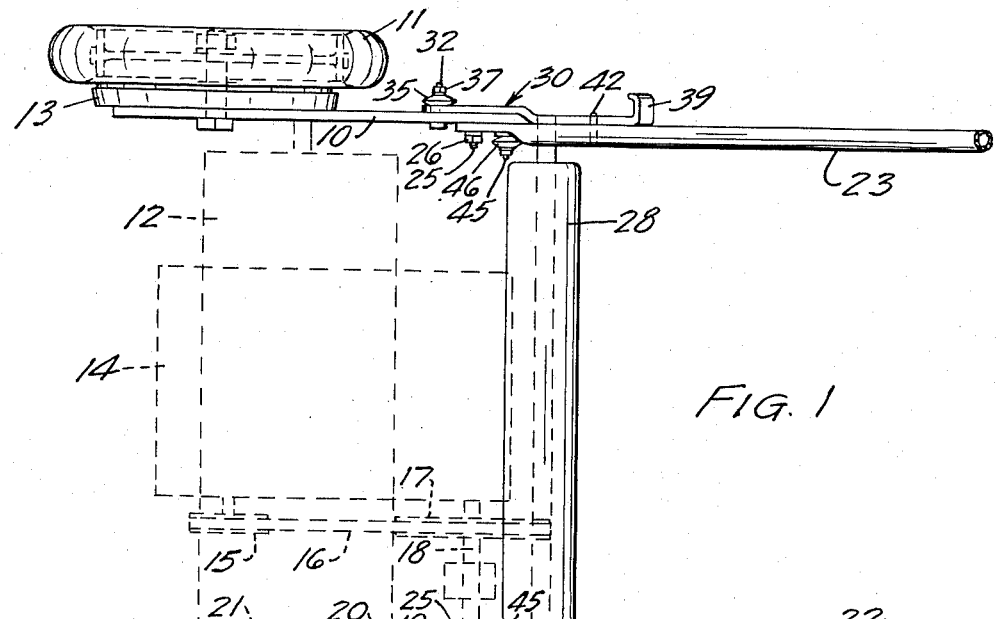
Fig. 1 is a plan view of a power lawn mower with the handles thereof partly broken away and having our invention mounted thereon.

The lawn mower shown in the accompanying views comprises a substantially conventional or reel type power mower having a frame 10 comprised of spaced apart and rigidly interconnected frame members on opposite sides of the mower and having wheels 11 and the cutting reel 12 secured to and journalled on frame 10. Each end of the cutting reel 12 is connected to the corresponding wheel 11 through a suitable gear mechanism enclosed in gear box 13 which provides cooperative rotation of the wheels 11 and reel 12. A motor 14 is carried by frame 10 and is located centrally between the wheels 11 and above reel 12 and supplies power to the reel 12 and wheels 11 through a suitable power transmission mechanism. Such mechanism may include pulley 15 fixedly secured to the spindle shaft of motor 14, a rotatable idler shaft 18 suitably journalled in frame 10 for rotation about an axis substantially parallel to the axis of the rotation of pulley 15, pulley 17 which is fixedly secured to shaft 18 and aligned with pulley 15 and connected thereto by belt 16, pulley 19 which is fixedly secured to shaft 18 and aligned with and connected to pulley 21 on reel 12 by belt 20. Of course a suitable blade is provided adjacent to reel 12 to cooperate therewith in cutting the grass as reel 12 is revolved.

Mower-guiding members are also secured to frame 10 and are of two general types, both serving to guide the mower as it travels over the terrain. Such guiding members will include handles 22 and 23 and roller-positioning elements 24. Handles 22 and 23 are swingably secured to opposite sides of frame 10 by pivots 25 and nuts 26. The handles 22 and 23 are free to swing in a vertical direction. Said handles may be interconnected by a suitable gripping member (not shown) which the operator of the mower may hold to guide the mower.

The roller-positioning elements 24 are swingably mounted on opposite sides of frame 10 by pivot 27 and are secured thereon by any suitable means such as a nut. Mower-positioning elements 24 extend rearwardly from frame 10 and are swingable in a vertical plane. A conventional type roller 28 is disposed between and rotatably carried by the roller positioning elements 24 and is shiftable in a vertical direction with swinging of the roller-positioning elements.

Figure 3:
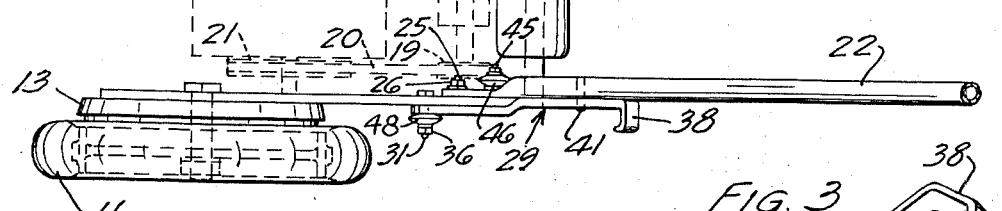
Fig. 3 is a detail perspective view of the bracket member comprising a portion of our invention.
Figure 2:
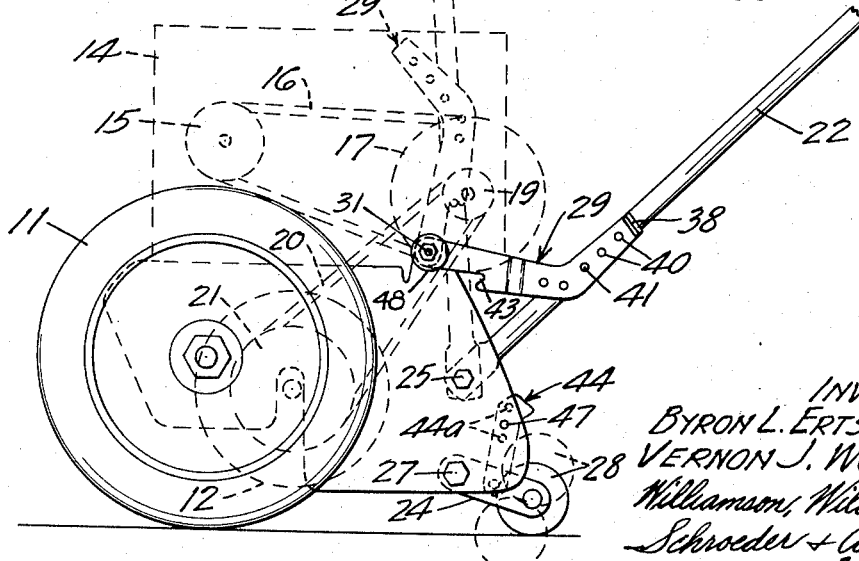
Fig. 2 is a side elevation view of said lawn mower with our invention mounted thereon, with the handle thereof being partly broken away and shown, in addition to the full line position, in a dotted line shifted position.

A pair of adjustable handle-positioning brackets 29 and 30 are provided for adjustably fixing the relative position of handles 22 and 23. Each of the brackets 29 and 30 is constructed and attached in substantially the same manner and the description of bracket 29 which is disclosed in detail in Fig. 3 is equally applicable to bracket 30. Brackets 29 and 30 are both swingably connected to frame 10 on pivots 31 and 32 respectively, bracket 29 extending into proximity and engagement with handle 22, and bracket 30 extending into proximity and engagement with handle 23.

As best shown in Fig. 3, bracket 29 comprises an elongated rigid interconnecting strap 33 which may be constructed of any substantially rigid material such as steel, and has an inner end portion 33a and outer end portion 33b. The inner end portion 33a is provided with an aperture 34 therein of somewhat greater internal diameter than the external diameter of the corresponding pivot 31 which is secured to frame 10. Interconnection strap 33 is thereby, when mounted on pivot 31, shiftable laterally thereof in a direction substantially normal to the direction of vertical swinging thereof. Bracket 30, being constructed similarly to bracket 29, is also laterally shiftable. Compression elements 48 and 35 are mounted on pivots 31 and 32 respectively and are retained thereon as by nuts 36 and 37 respectively and are thereby securely attached to frame 10. Compression elements 48 and 35 are substantially similar and are each constructed of a pair of substantially circular concavely curved discs made of a resilient and somewhat rigid material, such as spring steel, and are arranged with the peripheral edges thereof engaging each other, the central concave portions thereof being disposed in spaced apart relation from each other. The discs are apertured to mount them on the respective pivots, the central portion of one of the discs engaging the respective nut for holding the compression element relative to frame 10, and the central portion of the other disc of each compression element engaging the corresponding handle-positioning bracket which is also swingably mounted on the pivot. Compression elements 48 and 35 resiliently urge the respective brackets 29 and 30 inwardly toward frame 10 and toward the respective mower handles 22 and 23 for maintaining the bracket in engagement therewith. Handle members 38 and 39 are provided for brackets 29 and 30 and are, in the form shown, formed integrally thereof.

A plurality of apertures 40 are provided in interconnecting strap 33, and in bracket 30, for receiving the anchoring lugs or pins 41 and 42 which are respectively fixedly secured to the handles 22 and 23. Apertures 40 are disposed in spaced relation to each other along the length of the outer end portion 33b of strap 33 and in the form shown one of said apertures is provided in the inner portion 33a thereof.

Inner end portion 33a is disposed at an obtuse angle with relation to the outer end portion 33b of strap 33 and said obtuse angle is related to the distances between lug 41 and pivot 25 and between pivot 25 and pivot 31. If the distance between pivot 31 and pivot 25 were to be decreased, the obtuse angle between the inner and outer end portions of strap 33 would be increased, and if the distance between the pivot 25 and pivot 31 were to be increased, the obtuse angle between the inner and outer end portions of strap 33 would be decreased. When the lug 41 is inserted into an aperture 40 disposed intermediate of the length of outer end portion 33b of strap 33, the outer end portion 33b of strap 33 will be substantially parallel to handle 22. When the lug 41 is inserted into any of the other apertures 40 of strap 33, the outer end portion 33b will remain in substantially parallel relation with handle 22, and will not materially extend rearwardly of handle 22 in any position thereof.

A forwardly opening notch 43 is provided in the lower edge of the inner end portion 33a of strap 33 and is disposed in spaced relation with aperture 34 and pivot 31. Lug 41 may be inserted into notch 43 when the handle 22 is swung to a substantially vertical position and when the interconnecting strap 33 is swung to a corresponding position.

Bracket members or interconnecting straps 44 are also provided for adjustably fixing the vertical position of the roller-guiding elements 24. In the form shown, straps 44 are swingably secured to element 24 by pivots 45 and are secured thereon by compression elements 46 having suitably provided nuts. Straps 44 are swingable in a vertical direction relative to roller-positioning elements 24 and relative to frame 10 and are shiftable laterally in a direction normal to the direction of swinging thereof and are resiliently urged laterally toward frame 10 by the compression elements 46. Anchoring lugs 47 are provided on frame 10 above roller-positioning elements 24 for insertion into the apertures 44a of strap 44. Straps 44 may be shifted outwardly from frame 10 against the compressive forces of compression elements 46 to disengage lugs 47 and to thereby permit swinging of the roller-positioning elements 24 for positioning roller 28. Lug 47 may be inserted into another aperture 44a of strap 44 for fixing roller 28 in a new vertical position.

When it is desired to adjust the position of handles 22 and 23, brackets 29 and 30 will be shifted laterally outwardly from the responsive handles to disengage the brackets from the corresponding lugs of the handles. The handles 22 and 23 may be swung to a different vertical position and brackets 29 and 30 may be adjusted to align an aperture of each of the brackets with the corresponding lug of the adjacent handle. Compression elements 48 and 35 will constantly resiliently urge brackets 29 and 30 inwardly toward handles 22 and 23 to positively maintain lugs 41 and 42 in one of the apertures thereof for positively locking the position of the handles. The outer end portion 33b of interconnecting strap 33 comprising bracket 29, and bracket 30 being similarly constructed, will be maintained in substantially parallel relation with the handles in all positions thereof.

It will be seen that we have provided new and improved apparatus of extremely simple and inexpensive construction and operation for readily and easily adjustably fixing the vertically swingable handle of a lawn mower in any of a wide range of vertical positions including a substantially upright position for storing the lawn mower.

It should also be noted that we have provided a novel bracket which is swingably carried by the frame of the mower and is adjustably and releasably connected to the mower handle and is constantly resiliently urged thereagainst to provide positive locking of the position of the handle and which bracket is shaped and constructed to materially restrict extension of the handle-connecting portion thereof rearwardly from the handle and to maintain the handle-connecting portion thereof in an out-of-the-way position at all times and in substantially all positions of the mower handle.

It will also be apparent that we have provided an improved interconnecting bracket for readily and easily adjustably fixing and positively locking any of the vertically swingable mower-guiding members of a lawn mower, including both the handles thereof and the roller-guiding elements, in any of a wide range of vertical positions.

It will, of course, be understood that various changes may be made in the form, detail, arrangement and proportion of the parts without departing from the scope of our invention which consists of the matter described herein and set forth in the appended claims.

What we claim is:

1. In a lawn mower the combination of a frame, a pair of vertically swingable guide members pivotally connected to opposite sides of said frame and extending rearwardly therefrom, and a roller journalled between said guide members and being adapted to engage the ground for positioning said frame with respect thereto, said frame having a pair of anchoring lugs each secured thereto in outstanding relation therewith adjacent to and above one of said swingable guide members, a pair of apertured interconnection straps each having an inner end portion with pivotal and laterally yieldable connection to one of said guide members in spaced relation with the pivotal connection of the guide member with the frame and being vertically swingable with relation to the corresponding guide member and to said frame, each of said interconnecting straps extending into proximity with the corresponding anchoring lug and receiving the same in one of the apertures thereof for releasably maintaining said guide member in fixed relation with said frame, and each of said straps being shiftable laterally thereof and in a direction substantially normal to the direction of swinging thereof to permit said strap to be disengaged from the corresponding lug to thereby permit relative swinging and adjustment in the position of said guide member and said roller, and a pair of compression elements each secured to one of said guide members and engaging and resiliently urging the corresponding interconnecting strap toward said lug to maintain said lug in the aperture of said strap.

2. A bracket member for use with a lawn mower provided with a horizontally extending lug secured to the rearwardly extending handle in spaced relation with the pivotal connection thereof with the frame, said bracket member comprising a substantially boomerang-shaped interconnecting strap having an inner end portion with pivotal and laterally yieldable connection to the mower frame in spaced relation with the pivotal connection of the handle and said strap extending rearwardly of the frame into proximity with the handle, and said strap having an apertured outer end portion extending at an obtuse angle with respect to said inner end portion and upwardly therefrom into substantially parallel relation with the inclined mower handle when the lug is inserted into an aperture intermediate of the length of said outer end portion.

3. The structure recited in claim 2 and including a handle member secured to said outer end portion of said strap and extending transversely thereof and laterally outwardly away from the mower handle to permit gripping of said strap to shift the same laterally outwardly from the mower handle to disengage the lug from the strap and to thereby permit adjusting of the mower handle.

4. Handle-positioning apparatus for use with a lawn mower of the type having a frame supported in a substantially predetermined orientation relative to the ground surface, said apparatus comprising an anchoring lug securable to said handle in outstanding relation thereon and in spaced relation with the pivotal connection thereof to the frame, and a generally boomerang-shaped interconnecting strap including an inner end portion having pivotal connection with the frame of the lawn mower in spaced relation to and above the handle pivot, said inner end portion extending rearwardly of the mower frame, and said strap including an outer end portion extending angularly rearwardly and upwardly from the mower frame and having a plurality of apertures disposed along the length thereof to receive said anchoring lug and to thereby provide a handle-positioning interconnection between the handle and frame, said outer end portion being oriented to extend substantially parallel with the mower handle when said lug is inserted into an aperture located intermediate of the length of said outer end portion.

5. In apparatus for adjustably fixing the position of the swingable handle of a lawn mower relative to the frame thereof, comprising an anchoring lug securable to said handle in outstanding relation thereon and in spaced relation with the pivotal connection thereof to the frame, a generally boomerang-shaped interconnecting strap including an inner end portion having pivotal and laterally yieldable connection with the frame of the mower in spaced relation to and above the pivotal connection of the handle, said inner end portion extending rearwardly of the frame, and said strap including a substantially straight outer end portion extending angularly upwardly and rearwardly from the mower frame and extending at an obtuse angle relative to said inner end portion, said outer end portion having a plurality of apertures disposed along the length thereof to releasably receive said anchoring lug and to thereby fix the position of the handle relative to the mower frame, said outer end portion being oriented to extend substantially parallel with the mower handle when said lug is inserted into an aperture located intermediate of the length of said outer end portion, and said strap being shiftable on the pivot thereof with the frame in a direction laterally outwardly of the handle into disengagement with said lug, and a resilient compression element adapted to be secured to the frame and in engagement with said strap resiliently urging the same toward the handle and thereby maintaining said strap and said lug in engaged relation, whereby the handle of said mower may be swung to and fixed in any of a plurality of positions in a wide arc of rotation throughout which said interconnecting strap will be maintained in an out-of-the-way position substantially parallel to the handle.

References Cited in the file of this patent

UNITED STATES PATENTS

| 1,015,969 | McCrary | Jan. 30, 1912 |
| 1,622,611 | Sera | Mar. 29, 1927 |
| 1,654,767 | Vanette | Jan. 3, 1928 |
| 1,735,527 | Cwik | Nov. 12, 1929 |
| 1,896,442 | Farmer | Feb. 7, 1933 |
| 1,992,494 | Lundin | Feb. 26, 1935 |
| 2,617,670 | Welsh | Nov. 11, 1952 |